(12) United States Patent
Uliel et al.

(10) Patent No.: US 9,378,017 B2
(45) Date of Patent: Jun. 28, 2016

(54) APPARATUS AND METHOD OF EFFICIENT VECTOR ROLL OPERATION

(71) Applicant: Intel Corporation, Santa Clara, CA (US)

(72) Inventors: Tal Uliel, Tel Aviv (IL); Boris Bolshem, Haifa (IL); Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 13/730,911

(22) Filed: Dec. 29, 2012

(65) Prior Publication Data

US 2014/0189295 A1  Jul. 3, 2014

(51) Int. Cl.
G06F 15/76 (2006.01)
G06F 7/38 (2006.01)
G06F 9/30 (2006.01)

(52) U.S. Cl.
CPC ........ G06F 9/30036 (2013.01); G06F 9/30032 (2013.01)

(58) Field of Classification Search
CPC .......................... G06F 9/30036; G06F 15/8053
See application file for complete search history.

(56) References Cited

U.S. PATENT DOCUMENTS

| 7,716,460 | B2 * | 5/2010 | Stempel .............. G06F 9/30149 712/240 |
| 2002/0116595 | A1 * | 8/2002 | Morton .................... G06F 8/45 712/22 |
| 2003/0014457 | A1 * | 1/2003 | Desai ........................ G06F 7/57 708/520 |
| 2004/0193848 | A1 * | 9/2004 | Tavares ............... G06F 9/30018 712/224 |
| 2006/0095485 | A1 * | 5/2006 | Moore .................... G06F 7/766 708/200 |
| 2010/0272227 | A1 * | 10/2010 | Dielissen ............... G11C 21/00 377/69 |

FOREIGN PATENT DOCUMENTS

| CN | 101002169 A | 7/2007 |
| CN | 101517534 A | 8/2009 |
| EP | 1821195 | 8/2007 |
| JP | 63-115229 A | 11/1989 |
| JP | 2004-118470 A | 4/2004 |
| WO | WO 2005/114441 | 12/2005 |

OTHER PUBLICATIONS

Office Action from counterpart Great Britain Patent Application No. 132311231, mailed Jul. 18, 2014, 2 pages.

(Continued)

Primary Examiner — Hyun Nam
(74) Attorney, Agent, or Firm — Nicholson De Vos Webster & Elliott, LLP

(57) ABSTRACT

A machine readable storage medium containing program code is described that when processed by a processor causes a method to be performed. The method includes creating a resultant rolled version of an input vector by forming a first intermediate vector, forming a second intermediate vector and forming a resultant rolled version of an input vector. The first intermediate vector is formed by barrel rolling elements of the input vector along a first of two lanes defined by an upper half and a lower half of the input vector. The second intermediate vector is formed by barrel rolling elements of the input vector along a second of the two lanes. The resultant rolled version of the input vector is formed by incorporating upper portions of one of the intermediate vector's upper and lower halves as upper portions of the resultant's upper and lower halves and incorporating lower portions of the other intermediate vector's upper and lower halves as lower portions of the resultant's upper and lower halves.

20 Claims, 16 Drawing Sheets

(56) References Cited

OTHER PUBLICATIONS

Office Action from Counterpart JP Patent Application No. 2013/238546, Mailed Nov. 18, 2014, 2 pages.
Office action from Chinese Patent Application No. 201310713448.3, mailed Dec. 30, 2015, 13 pages.
Notice of Allowance with English translation from Japanese Patent Application No. 2013-238546, mailed Apr. 7, 2015, 6 pages.
Office action with English translation from Korean Patent Application No. 10-2013-164516, mailed Apr. 21, 2015, 5 pages.
Office action from Great Britain Patent Application No. 1323112.1, mailed Jun. 1, 2015, 3 pages.

* cited by examiner

VBROADCAST
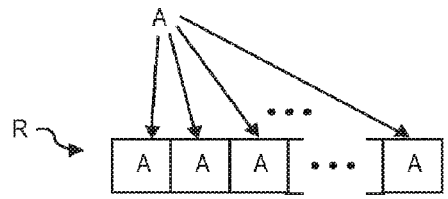
FIG. 3A
VPADD          VPSUBB
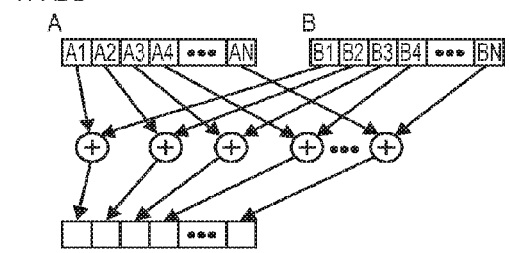    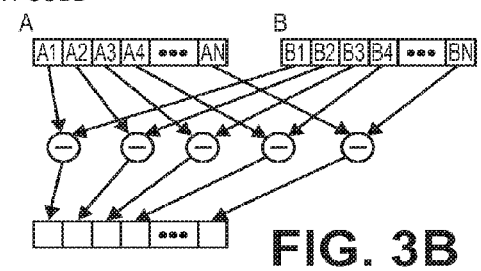
FIG. 3B
VPSHUFB
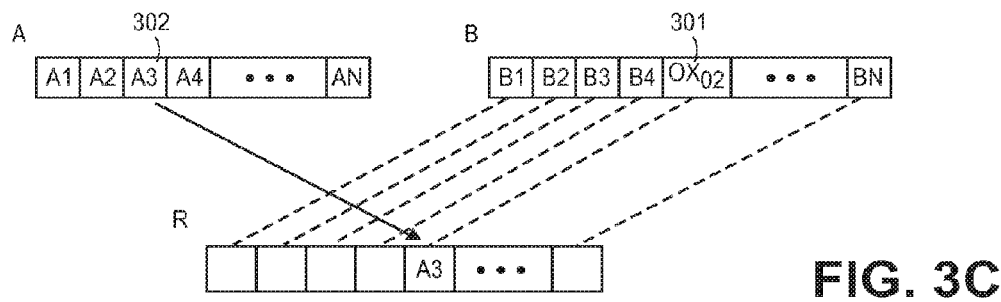
FIG. 3C
VPXOR
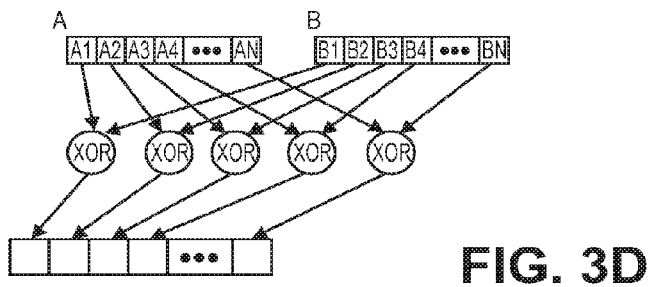
FIG. 3D

```
Pseudo code rax //the number of bytes we want to shift left
0: vpbroadcastb ymm3, eax // broadcast the shift val on
the entire vector register
1: vpsubb ymm4, ymm1, ymm3 // create the shuffle ctrl
from the shift mask and the shift value
2: vpshufb ymm4, ymm0, ymm4 // rotate the two 128bit
lanes by the shift value
3: vpsubb ymm5, ymm2, ymm3 // create the blend ctrl from
the blend mask and the shift value
4: vpxor ymm3, ymm3, ymm3 // zero ymm3 vector register
5: vinserti128 xmm3, ymm4, 1 // insert the low lane of
rotated values
6: vpblendvb ymm4, ymm4, ymm3, ymm5 // merges the rotated
value to get the desired shift // result Example run: (all values are bytes)

ymm0 //256bit data element ymm0 = {a0, b0, c0, d0, e0, f0, g0, h0, i0, j0, k0, l0, m0,
n0, o0, p0,
        a1, b1, c1, d1, e1, f1, g1, h1, i1, j1, k1, l1, m1,
n1, o1, p1};
rax = 3;

ymm1 // Shift_Mask =
{0x10,0x11,0x12,0x13,0x14,0x15,0x16,0x17,0x17,0x18,0x19,0x1a,0x1b,0x1c,0x
1d,0x1e,0xf1, 0x20,0x21,0x22,0x23,0x24,0x25,0x26,0x27,0x28,0x29,0x2a,0x2b,0x2c,0x2
d,0x2e,0x2f}
ymm2 // Blend_Mask =
{0x00,0x01,0x02,0x03,0x04,0x05,0x06,0x07,0x08,0x09,0x0a,0x0b,0x0c,0x
0d,0x0e,0x0f, 0x00,0x01,0x02,0x03,0x04,0x05,0x06,0x07,0x08,0x09,0x0a,0x0b,0x0c,0x0
d,0x0e,0x0f}
```

FIG. 6

[0:] broadcast the shift value

655 → ymm3 =
{0x03,0x03,0x03,0x03,0x03,0x03,0x03,0x03,0x03,0x03,0x03,0x03,0x03,0x03,0x03,0x03, 0x03,0x03,0x03,0x03,0x03,0x03,0x03,0x03,0x03,0x03,0x03,0x03,0x03,0x03,0x03,0x03}
;

[1:] generate shuffle control by subtracting shift value from
shift mask(ymm1).

656 → ymm4 =
{0x0d,0x0e,0x0f,0x10,0x11,0x12,0x13,0x14,0x15,0x16,0x17,0x18,0x19,0x1a,0x1b,0x1c 0x1d,0x1e,0x1f,0x1C,0x21,0x22,0x23,0x24,0x25,0x26,0x27,0x28,0x29,0x2a,0x2b,0x2c}
;

[2:] rotate the bytes in each 128bit lane of the 256bit register using the
loaded shuffle values. Detailed explanation on how the shuffle operate
with the control can be found in any Intel® EAS under vpshufb.

658 → ymm4 =
{n0,o0,p0,a0,b0,c0,d0,e0,f0,g0,h0,i0,j0,k0,l0,m0,  ⎫ 663
 n1,o1,p1,a1,b1,c1,d1,e1,f1,g1,h1,i1,j1,k1,l1,m1};

[3:] generate blend control by subtracting shift value from
blend mask (ymm2).

659 → ymm5 =
{0xfd,0xfe,0xff,0x00,0x01,0x02,0x03,0x04,0x05,0x06,0x07,0x08,0x09,0x0a,0x0b,0x0c,
 0xfd,0xfe,0xff,0x00,0x01,0x02,0x03,0x04,0x05,0x06,0x07,0x08,0x09,0x0a,0x0b,0x0c};

660 → [4:] zeroing of ymm3, preparation for the later merge
ymm3 = { 0, 0, 0, 0, 0, 0, 0, 0, 0, 0, 0, 0, 0, 0, 0, 0,
         0, 0, 0, 0, 0, 0, 0, 0, 0, 0, 0, 0, 0, 0, 0, 0};

[5:] inserting the low 128bit lane of the rotation result.
661 → ymm3 = { 0, 0, 0, 0, 0, 0, 0, 0, 0, 0, 0, 0, 0, 0, 0, 0,
664 →         n0, o0, p0, a0, b0, c0, d0, e0, f0, g0, h0, j0, i0, k0, l0, m0};

[6:] merging the extracted register [4:]ymm3) with the rotated
register [2:]ymm4) using the blend masked we created previously [3:]ymm5)
662 → ymm4 = { 0, 0, 0, a0, b0, b0, d0, e0, f0, g0, h0, i0, j0, j0, l0, m0,
              n0, o0, p0, a1, b1, c1, d1, e1, f1, g1, h1, j1, i1, k1, l1, m1};

FIG. 6 (CONT.)

```
Pseudo code
[0:] neg rax // negate the shift value to access the tables
correctly
[1:] vbroadcasti128 ymm1, [rsi+32+1*rax] // access the
shuffle table by the negated shift value
[2:] vbroadcasti128 ymm3, [rdi+32+1*rax] // access the
blend table by the negated shift value
[3:] vpshufb ymm1, ymm0, ymm1 // rotate the two 128bit
lanes by the shift value
[4:] vpxor ymm2, ymm2, ymm3 // generate all zero resgister
[5:] vinsertti128 xmm2, ymm1, 1 // insert the low 128bit
lane of rotated values
                                                         //
to the upper part of ymm2
[6:] vpblendvb ymm1, ymm1, ymm2, ymm3 // merges the rotated
value to get the desired shift // result
Example run: (all values are bytes)
ymm0 //256bit data element
rax //the number of bytes we want to shift left
ymm0 = {a0, b0, c0, d0, e0, f0, g0, h0, i0, j0, k0, l0, m0,
n0, o0, p0,
        a1, b1, c1, d1, e1, f1, g1, h1, i1, j1, k1, l1, m1,
n1, o1, p1};

rax = 13;

rsi → char ShufleTable[] =unsigned char maskshift[48] =
{0x80,0x80,0x80,0x80,0x80,0x80,0x80,0x80,0x80,0x80,0x80,0x80,0x80,0x
80,0x80,0x80, 0x00,0x01,0x02,(0x03)0x04,0x05,0x06,0x07,0x08,0x09,0x0a,0x0b,0x0c,0x0
d,0x0e,0x0f};

(0x00)0x01,0x02,0x03,0x04,0x05,0x06,0x07,0x08,0x09,0x0a,0x0b,0x0c,0x0
d,0x0e,0x0f};

rsi → char  BlendMask[] =  unsigned char maskblend[48] =
{0xff,0xff,0xff,0xff,0xff,0xff,0xff,0xff,0xff,0xff,0xff,0xff,0xff,0x
ff,0xff,0xff, 0xff,0xff,0xff,0xff,0xff,0xff,0xff,0xff,0xff,0xff,0xff,0xff,0xff,0xf
f,0xff,0xff, 0x00,0x00,0x00,0x00,0x00,0x00,0x00,0x00,0x00,0x00,0x00,0x00,0x0
0,0x00,0x00};
```

FIG. 7

```
[0:] generate shuffle control by subtracting shift value from
[1:] shift mask(ymm1).
ymm4 =
{0x03,0x04,0x05,0x06,0x07,0x08,0x09,0x0a,0x0b,0x0c,0x0d,0x0e,0x0f,0x00,0x01,0x02,
 0x03,0x04,0x05,0x06,0x07,0x08,0x09,0x0a,0x0b,0x0c,0x0d,0x0e,0x0f,0x00,0x01,0x02};

[2:] load 16 values from BlendMask according to the negated shift value and
place them in both lanes.
ymm3 =
{0xff,0xff,0xff,0xff,0xff,0xff,0xff,0xff,0xff,0xff,0xff,0xff,0xff,0x00,0x00,0x00,
 0xff,0xff,0xff,0xff,0xff,0xff,0xff,0xff,0xff,0xff,0xff,0xff,0xff,0x00,0x00,0x00};

[3:] rotate the bytes in each 128bit lane of the 256bit register using the
loaded shuffle values. Detailed explanation on how the shuffle operate
with the control can be found in any Intel® EAS under vpshufb.
ymm1 = [d0, e0, f0, g0, h0, i0, j0, k0, l0, m0, n0, o0, p0, a0, b0, c0,
        d1, e1, f1, g1, h1, i1, j1, k1, l1, m1, n1, o1, p1, a1, b1, c1];

[4:] zeroing of ymm2, preparation for the later merge
ymm2 = { 0,  0,  0,  0,  0,  0,  0,  0,  0,  0,  0,  0,  0,  0,  0,  0,
         0,  0,  0,  0,  0,  0,  0,  0,  0,  0,  0,  0,  0,  0,  0,  0};

[5:] inserting the low 128bit lane of the rotation result.
ymm2 = { 0,  0,  0,  0,  0,  0,  0,  0,  0,  0,  0,  0,  0,  0,  0,  0,
        d0, e0, f0, g0, h0, i0, j0, k0, l0, m0, n0, o0, p0, a0, b0, c0};

[6:] merging the inserted register ([5:]ymm2) with the rotated
register ([3:]ymm1) using the blend masked we load previously ([2:]ymm3)

ymm1 = { 0,  0,  0,  0,  0,  0,  0,  0,  0,  0,  0,  0,  0, a0, b0, c0,
        d0, e0, f0, g0, h0, i0, j0, k0, l0, m0, n0, o0, p0, a1, b1, c1};
```

FIG. 7 (CONT.)

```
Pseudo code

[0:] vpbroadcastb ymm3, eax // broadcast the shift val on the entire
vector register
[1:] vpaddb ymm4, ymm1, ymm3 // create the shuffle ctrl from the shift
mask and the shift value
[2:] vpshufb ymm4, ymm0, ymm4 // rotate the two 128bit lanes by the
shift value
[3:] vpaddb ymm5, ymm2, ymm3 // create the blend ctrl from the blend
mask and the shift value
[4:] vextracti128 xmm3, ymm4, 1 // extract the high lane of rorated
values and zero the upper
                                        // the upper
part of ymm3
[5:] vpblendvb ymm4, ymm4, ymm3, ymm5 // merges the rotated value to
get the desired shift // result
Example run: (all values are bytes)

ymm0 //256bit data element
ymm0 = {a0, b0, c0, d0, e0, f0, g0, h0, i0, j0, k0, l0, m0, n0, o0, p0,
        a1, b1, c1, d1, e1, f1, g1, h1, i1, j1, k1, l1, m1, n1, o1, p1};

rax     //the number of bytes we want to shift right
rax = 13;

ymm1 // Shift_Mask =
{0x00,0x01,0x02,0x03,0x04,0x05,0x06,0x07,0x08,0x09,0x0a,0x0b,0x0c,0x0d,0x0e,0x0f,
 0x60,0x61,0x62,0x63,0x64,0x65,0x66,0x67,0x68,0x69,0x6a,0x6b,0x6c,0x6d,0x6e,0x6f}
ymm2 // Blend_Mask =
{0x70,0x71,0x72,0x73,0x74,0x75,0x76,0x77,0x78,0x79,0x7a,0x7b,0x7c,0x7d,0x7e,0x7f,
 0x70,0x71,0x72,0x73,0x74,0x75,0x76,0x77,0x78,0x79,0x7a,0x7b,0x7c,0x7d,0x7e,0x7f}

[0:] broadcast the shift value
Ymm3 =
{0x0d,0x0d,0x0d,0x0d,0x0d,0x0d,0x0d,0x0d,0x0d,0x0d,0x0d,0x0d,0x0d,0x0d,0x0d,0x0d,
 0x0d,0x0d,0x0d,0x0d,0x0d,0x0d,0x0d,0x0d,0x0d,0x0d,0x0d,0x0d,0x0d,0x0d,0x0d,0x0d};
[1:] generate shuffle control by adding shift value to shift mask(ymm1).
ymm4 =
{0x0d,0x0e,0x0f,0x10,0x11,0x12,0x13,0x14,0x15,0x16,0x17,0x18,0x19,0x1a,0x1b,0x1c,
 0x6d,0x6e,0x6f,0x70,0x71,0x72,0x73,0x74,0x75,0x76,0x77,0x78,0x79,0x7a,0x7b,0x7c};
```

FIG. 8

```
[2:] rotate the bytes in each 128bit lane of the 256bit register using the
loaded shuffle values. Detailed explanation on how the shuffle operate
with the control can be found in any Intel® EAS under vpshufb.
ymm4 = {n0, o0, p0, a0, b0, c0, d0, e0, f0, g0, h0, i0, j0, k0, l0, m0,
   801  n1, o1, p1, a1, b1, c1, d1, e1, f1, g1, h1, i1, j1, k1, l1, m1};
[3:] generate blend control by adding shift value to blend mask (ymm2).
ymm5 =
{0x7d,0x7e,0x7f,0x80,0x81,0x82,0x83,0x84,0x85,0x86,0x87,0x88,0x89,0x8a,0x8b,0x8c, 0x7d,0x7e,0x7f,0x80,0x81,0x82,0x83,0x84,0x85,0x86,0x87,0x88,0x89,0x8a,0x8b,0x8c};
[4:] extracting the high 128bit lane of the rotation result, the upper lane
of the destination result is zeroed out.
ymm3 = {n1, o1, p1, a1, b1, c1, d1, e1, f1, g1, h1, i1, j1, k1, l1, m1,
         0,  0,  0,  0,  0,  0,  0,  0,  0,  0,  0,  0,  0,  0,  0,  0};
[5:] merging the extracted register ([4:]ymm3) with the rotated
register ([2:]ymm4) using the blend masked we created previously ([3:]ymm5)   802
ymm4 = {n0, o0, p0, a1, b1, c1, d1, e1, f1, g1, h1, i1, j1, k1, l1, m1,
         n1, o1, p1,  0,  0,  0,  0,  0,  0,  0,  0,  0,  0,  0,  0,  0};
```

FIG. 8 (CONT.)

```
Pseudo code
[0:] vbroadcasti128 ymm1, [rsi+1*rax] // loads the shuffle value
according to the shift number
[1:] vbroadcasti128 ymm3, [rdi+1*rax] // loads the blending mask
according to the shift number
[2:] vpshufb ymm1, ymm0, ymm1 // rotate the two 128bit lanes by the
shift value
[3:] vextracti128 xmm2, ymm1, 1 // extract the high lane of rotated
values and zero the upper
                                                  // the upper
part of ymm1
[4:] vpblendvb ymm1, ymm1, ymm2, ymm3 // merges the rotated value to
get the desired shift // result
Example run: (all values are bytes)

ymm0 //256bit data element
ymm0 = {a0, b0, c0, d0, e0, f0, g0, h0, i0, j0, k0, l0, m0, n0, o0, p0,
        a1, b1, c1, d1, e1, f1, g1, h1, i1, j1, k1, l1, m1, n1, o1, p1};

rax //the number of bytes we want to shift right
rax = 13;
                                                    ┌─ 901
                                                   /
rsi → char ShufleTable[] = unsigned char maskshift[48] =
{0x00,0x01,0x02,0x03,0x04,0x05,0x06,0x07,0x08,0x09,0x0a,0x0b,0x0c,0x0d,0x03,0x0f,
 0x00,0x01,0x02,0x03,0x04,0x05,0x06,0x07,0x08,0x09,0x0a,0x0b,0x0c,0x0d,0x03,0x0f,
 0x80,0x80,0x80,0x80,0x80,0x80,0x80,0x80,0x80,0x80,0x80,0x80,0x80,0x80,0x80,0x80};
                                                    ┌─ 902
rsi → char BlendMask[] =  unsigned char maskblend[48] =
{0x00,0x00,0x00,0x00,0x00,0x00,0x00,0x00,0x00,0x00,0x00,0x00,0x00,0x00,0x00,0x00,
 0xff,0xff,0xff,0xff,0xff,0xff,0xff,0xff,0xff,0xff,0xff,0xff,0xff,0xff,0xff,0xff,
 0xff,0xff,0xff,0xff,0xff,0xff,0xff,0xff,0xff,0xff,0xff,0xff,0xff,0xff,0xff,0xff};

[0:] load 32 values from ShuffleTable according to the shift value
ymm1 =
{0x0d,0x0e,0x0f,0x00,0x01,0x02,0x03,0x04,0x05,0x06,0x07,0x08,0x09,0x0a,0x0b,0x0c,
 0x0d,0x0e,0x0f,0x00,0x01,0x02,0x03,0x04,0x05,0x06,0x07,0x08,0x09,0x0a,0x0b,0x0c};
[1:] load 16 values from BlendMask according to the shift value and place
them in both lanes.
ymm3 =
{0x00,0x00,0x00,0xff,0xff,0xff,0xff,0xff,0xff,0xff,0xff,0xff,0xff,0xff,0xff,0xff,
 0x00,0x00,0x00,0xff,0xff,0xff,0xff,0xff,0xff,0xff,0xff,0xff,0xff,0xff,0xff,0xff};
```

FIG. 9

[2:] rotate the bytes in each 128bit lane of the 256bit register using the
loaded shuffle values. Detailed explanation on how the shuffle operate with
the control can be found in any Intel® EAS under vpshufb.
ymm4 = {n0, o0, p0, a0, b0, c0, d0, e0, f0, g0, h0, i0, j0, k0, l0, m0,
        n1, o1, p1, a1, b1, c1, d1, e1, f1, g1, h1, i1, j1, k1, l1, m1};
[3:] extracting the high 128bit lane of the rotation result, the upper lane
of the destination result is zeroed out.
ymm2 = {n1, o1, p1, a1, b1, c1, d1, e1, f1, g1, h1, i1, j1, k1, l1, m1,
        0,  0,  0,  0,  0,  0,  0,  0,  0,  0,  0,  0,  0,  0,  0,  0};
[4:] merging the extracted register [3:]ymm2) with the rotated
register([2:]ymm1) using the blend masked we load previously ([1:]ymm3)
ymm1 = {n0, o0, p0, a1, b1, c1, d1, e1, f1, g1, h1, i1, j1, k1, l1, m1,
        n1, o1, p1, 0,  0,  0,  0,  0,  0,  0,  0,  0,  0,  0,  0,  0};

FIG. 9 (CONT.)

APPARATUS AND METHOD OF EFFICIENT VECTOR ROLL OPERATION

FIELD OF INVENTION

The field of invention relates generally to the computing sciences, and, more specifically, to an efficient vector roll operation.

BACKGROUND

FIG. 1 shows a high level diagram of a processing core 100 implemented with logic circuitry on a semiconductor chip. The processing core includes a pipeline 101. The pipeline consists of multiple stages each designed to perform a specific step in the multi-step process needed to fully execute a program code instruction. These typically include at least: 1) instruction fetch and decode; 2) data fetch; 3) execution; 4) write-back. The execution stage performs a specific operation identified by an instruction that was fetched and decoded in prior stage(s) (e.g., in step 1) above) upon data identified by the same instruction and fetched in another prior stage (e.g., step 2) above). The data that is operated upon is typically fetched from (general purpose) register storage space 102. New data that is created at the completion of the operation is also typically "written back" to register storage space (e.g., at stage 4) above).

The logic circuitry associated with the execution stage is typically composed of multiple "execution units" or "functional units" 103_1 to 103_N that are each designed to perform its own unique subset of operations (e.g., a first functional unit performs integer math operations, a second functional unit performs floating point instructions, a third functional unit performs load/store operations from/to cache/memory, etc.). The collection of all operations performed by all the functional units corresponds to the "instruction set" supported by the processing core 100.

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 2a and 2b present a comparative example that demonstrates the basic difference between a scalar processor and a vector processor.

FIG. 2a shows an example of a scalar AND instruction in which a single operand set, A and B, are ANDed together to produce a singular (or "scalar") result C (i.e., AB=C). By contrast, FIG. 2b shows an example of a vector AND instruction in which two operand sets, A/B and D/E, are respectively ANDed together in parallel to simultaneously produce a vector result C, F (i.e., A.AND.B=C and D.AND.E=F). As a matter of terminology, a "vector" is a data element having multiple "elements". For example, a vector V=Q, R, S, T, U has five different elements: Q, R, S, T and U. The "size" of the exemplary vector V is five (because it has five elements).

FIG. 1 also shows the presence of vector register space 104 that is different that general purpose register space 102. Specifically, general purpose register space 102 is nominally used to store scalar values. As such, when, the any of execution units perform scalar operations they nominally use operands called from (and write results back to) general purpose register storage space 102. By contrast, when any of the execution units perform vector operations they nominally use operands called from (and write results back to) vector register space 107. Different regions of memory may likewise be allocated for the storage of scalar values and vector values.

Note also the presence of masking logic 104_1 to 104_N and 105_1 to 105_N at the respective inputs to and outputs from the functional units 103_1 to 103_N. In various implementations, only one of these layers is actually implemented—although that is not a strict requirement. For any instruction that employs masking, input masking logic 104_1 to 104_N and/or output masking logic 105_1 to 105_N may be used to control which elements are effectively operated on for the vector instruction. Here, a mask vector is read from a mask register space 106 (e.g., along with input data vectors read from vector register storage space 107) and is presented to at least one of the masking logic 104, 105 layers.

Over the course of executing vector program code each vector instruction need not require a full data word. For example, the input vectors for some instructions may only be 8 elements, the input vectors for other instructions may be 16 elements, the input vectors for other instructions may be 32 elements, etc. Masking layers 104/105 are therefore used to identify a set of elements of a full vector data word that apply for a particular instruction so as to effect different vector sizes across instructions. Typically, for each vector instruction, a specific mask pattern kept in mask register space 106 is called out by the instruction, fetched from mask register space and provided to either or both of the mask layers 104/105 to "enable" the correct set of elements for the particular vector operation.

A number of vector instructions have been implemented and are already known. These include the VPBROADCAST, VPSUBB, VPADD, VPSHUFB, VPXOR, VINSERT, VEXTRACT and VPBLEND instructions. FIGS. 3a through 3g demonstrate basic operation of these instructions respectively.

As observed in FIG. 3a, the VPBROADCAST instruction accepts a single scalar value A as an input operand and produces a vector element R having A in each element of the vector. The VBROADCAST instruction can also be used to provide a resultant that corresponds to values looked up from a lookup table if an address of the lookup table and an index into it from where the values are to be looked up is provided as input operands.

As observed in FIG. 3b, the VPSUBB and VPADD instructions produce a vector resultant R whose constituent elements corresponds to the respective subtraction/addition of same positioned elements in a pair of input vectors A, B.

As observed in FIG. 3c, the VPSHUFB instruction produces a vector resultant R by "shuffling" elements of an input vector A according to a shuffle scheme defined by input vector B. Here, each element of B corresponds to a same positioned element in R. Each element of B effectively identifies which element of A is to be placed in its respective element of R.

As such, in the example of FIG. 3c, input vector B (as well as input vector A) are vectors whose respective elements are each eight bits (a byte) in size. For example, the notation "0x42", as is understood in the art, is used to represent a byte whose upper four bits correspond to the value of 4 (i.e., "0100") and whose lower four bits correspond to the value of 2 (i.e., "0010"). That is, the notation 0x42 represents a byte having bit sequence 01000010.

An implementation of the VPSHUFB instruction only uses a portion of each element of input vector B to identify an element of input vector A for inclusion in the resultant R. For example, one implementation only uses the lower half of an element of input vector B to identify a particular element of vector A. For instance, as observed in FIG. 3c, element 301 of input vector B is "0x02". As such, the element 301 is specifying that the third (e.g., according to sequence, 0, 1, 2) element 302 in vector A is being selected for inclusion in the element of resultant R that corresponds to the same element location as element 301 in control vector B. Similarly, if an element of input vector B is 0x09 then the tenth element in input vector A is being selected for the same element location in resultant R.

In an embodiment where each vector is 128 bits and has 16 elements each of a byte in size, the lower half of an element of input vector B is four bits and can be specify any one of the 16 elements of input vector A (e.g., using hexadecimal form, the lower half of any element of input vector B can be any value from 0 to f). The value of the upper half of each element of input vector B is irrelevant except for any of values 8 through f, which corresponds to the most significant bit of the upper half of the element being equal to 1. In this case, the lower half of the element is ignored (i.e., it does not specify an element of vector A) and a value of 0 (00000000) is inserted into the element of the resultant R whose position corresponds to the element of input vector B having a most significant bit equal to 1.

The VPXOR instruction, as observed in FIG. 3d, provides in each element of resultant R the exclusive OR of same positioned elements in input vectors A and B.

The VINSERT instruction, as observed in FIG. 3e, prepares a resultant R by incorporating an input vector A into R and replacing either the higher half of elements or the lower half of elements in R with the lower half of elements of input vector B. In an implementation, whether the lower half of the elements of input vector B are inserted into the higher or lower half of R is determined by the setting of an immediate operand (e.g., if the immediate operand is a 1 the elements of B are inserted into the higher half of R, if the immediate operand is a 0 the elements of B are inserted into the lower half of R).

The VEXTRACT instruction, as observed in FIG. 3f, extracts, depending on the setting of an input parameter (in one implementation, an immediate operand), the higher half of elements or the lower half of elements of an input vector A and presents the extracted elements in the resultant R. For example, if input vector A is a 256 bit vector, resultant R will be the higher 128 bits or the lower 128 bits depending on whether the immediate operand is a 1 or a 0.

The VPBLEND instruction is akin to the VINSERT instruction but with more granularized control. The VPBLEND instruction, as observed in FIG. 3g, prepares a resultant R by incorporating an input vector A into R and replacing specific elements of R on an element by element basis with corresponding (same positioned) elements of input vector B depending on the settings of a mask input vector M. For example, if A/R is a 256 bit vector there are 32 byte sized elements. M is a 32 bit input vector where each bit corresponds to a unique element in A/R and B. If M contains a value of 1 in a particular location, the corresponding byte in B is incorporated into the corresponding byte in R.

A problem in previous processor implementations is that if a need arose to "roll" vector elements left or right, the compiler produced a long instruction stream that required at least one instruction to move each input element to its correct destination element location. For example, FIG. 4 shows a vector A and its constituent elements. If, for whatever reason, a compiler recognizes a need to "roll" the vector's elements to the left or right, at least one instruction will be constructed into the object code for each element in the vector. FIG. 4 shows an example where the vector A needs to be moved three elements to the left (in instruction execution parlance left and right directions may be reversed as compared to their representation on a hand drawn page). As such, at least one instruction is needed for each of operations 401_1 through 401_N-2 to create the needed vector N.

FIGURES

The present invention is illustrated by way of example and not limitation in the figures of the accompanying drawings, in which like references indicate similar elements and in which:

FIG. 1 shows an exemplary instruction execution pipeline;

FIGS. 2a and 2b demonstrate vector processing;

FIGS. 3a through 3g show operations performed by various vector instructions;

FIG. 6 shows a first vector shift left process;

FIG. 7 shows a second vector shift left process;

FIG. 8 shows a first vector shift right process;

FIG. 9 shows a second vector shift right process;

DETAILED DESCRIPTION

Figure 4:
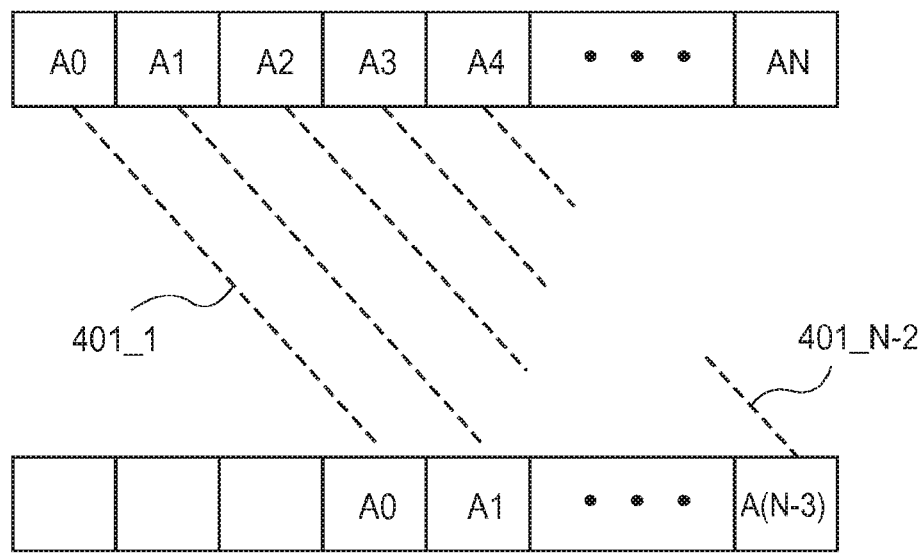
FIG. 4 shows a prior art vector roll process.
Figure 5:
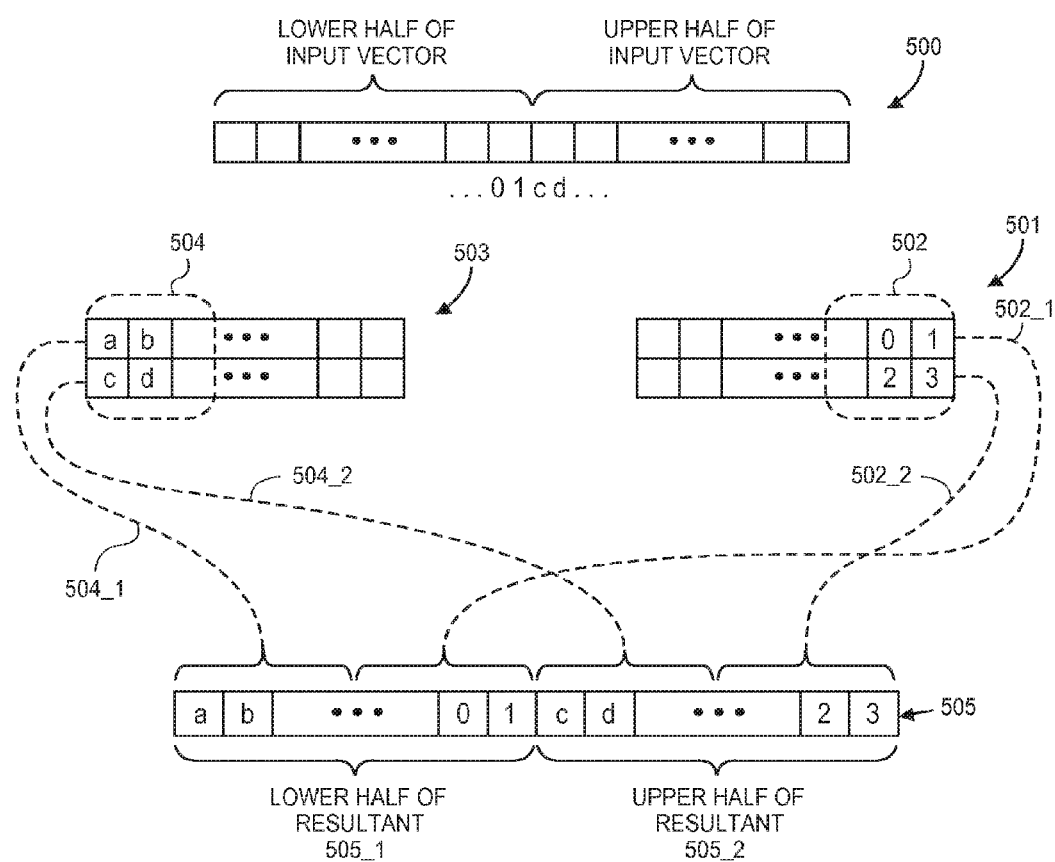
FIG. 5 shows an improved vector roll process.

FIG. 5 shows an improved code construction process for a compiler that will produce an object code footprint smaller than that produced if the approach of FIG. 4 discussed above is adopted. According to the approach of FIG. 5, the elements of an input vector 500 are to be rolled (to the left or right) to form a rolled resultant vector 505. In determining the resultant vector, a first intermediate value 501 is created having properly rolled upper portions 502_1, 502_2 of the resultant vector's lower half 505_1 and upper half 505_2. A second intermediate value 503 is also created having properly rolled lower portions 504_1, 504_2 of the resultant vector's lower half 505_1 and upper half 505_2. The resultant is then formed by correctly merging the portions 502, 504 into their corresponding sections of the resultant vector's upper 505_1 and lower halves 505_2.

As observed in FIG. 5, although the intermediate values 501, 503 are created by operating on the full size input vector 500, in an embodiment, roll operations are performed on the lower and/or higher halves of the input vector individually. Said another way, in forming an intermediate vector, barrel roll operations are performed over either or both of two lanes defined by the input vector's upper half and the input vector's lower half. The mathematical effect allows portions 502 and 504 of FIG. 5 to be easily depicted when the two halves of the intermediate vector are viewed as being stacked (one half on top of another half). The following figures and discussion provide more detailed embodiments as discussed immediately below. Vector registers associated with a vector instruction pipeline are given the prefix "ymm".

FIG. 6 shows a sequence of instructions 600 for rolling a vector to the left. Process 650 demonstrates an example of the intermediate values created by the instruction sequence 600 for a 256 bit vector having 32 byte sized elements. The immediately following description refers to both the instruction sequence 600 and the exemplary intermediate value sequence 650. Note that the notation 0xMN is used to represent a specific byte value for the control vectors described below where each of M and N can be any hexadecimal value from 0 to f.

According to the process of FIG. 6, a vector 651 contained in register ymm0 is the vector whose elements are to be rolled (the "input vector"). In the exemplary sequence 650, the input vector 651 is to be rolled to the left by three byte sized element locations. Here, a scalar parameter rax 652 defines the amount of element locations to be rolled (rax=3 for exemplary process 650).

A shift mask vector 653 and a blend mask vector 654 are pre-established vectors whose contents are created by the compiler pre runtime according to one embodiment. As observed in FIG. 6, the two vectors 653, 654 are called from memory and stored in registers ymm1 and ymm2, respectively prior to execution of the roll sequence. A VBROADCAST instruction is then executed 601 with the rax parameter as an input operand. The resultant is placed in register ymm3. Exemplary sequence 650 shows an exemplary resultant 655 of the VBROADCAST instruction 601 in ymm3.

A control input vector 656 to be used for a following VSHUFB instruction 603 is then created through execution of a VPSUBB instruction 602 that effectively subtracts the rax value 652 (using vector 655) from each element in the shift mask vector 653 and places the result 656 in ymm4.

Here, some appreciation of the shift mask vector's 653 initial values is warranted. As observed in FIG. 6, the values of the elements of the shift mask vector 653 increment by 1 element by element moving across the vector. As the shift mask vector 563 will be used to formulate an input for a subsequent VPSHUFB instruction, 603 the neighboring element increment feature of vector 563 will cause neighboring elements of the input vector 651 to be placed next to one another in the final rolled resultant vector. Also, in the embodiment of exemplary sequence 650, there are 32 elements in the input vector 651. As such, conceivably, a maximum shift of 32 could be applied. Here, the initial value of the first element 657 of shift mask vector 653 (0x10), which is also the lowest valued element in the vector 653, corresponds to a value of 32. Thus, if a maximum shift of 32 element locations were to be applied (i.e., rax=32), initial element value 657 would reduce to a value of 0 (0x00). Thus, the value of the first element 657 of the shift mask vector 653 corresponds to the maximum size of the shift supported by the crafted code sequence.

The VPSUBB instruction 602 creates in ymm4 a control vector 656 for a following VPSHUFB instruction 603. In an embodiment, a 256 bit VPSHUFB instruction 603 is implemented as a dual lane version of the 128 bit VPSHUFB instruction 604 described in the background. That is, the 256 bit input vector 651 that is operated upon by the VPSHUFB instruction 604 is viewed by the VPSHUFB instruction 603 as two concatenated 128 bit vectors, each treated according to the same control vector.

The resultant 658 of the VPSHUFB instruction 603 in exemplary code sequence 650 shows two lanes that have been shifted according to the first half of the elements of control vector 656. That is, the first half of the control vector 656 is of the form 0x0d, 0x0e, 0x0f, 0x00, . . . 0x0c, which, corresponds to a barrel roll of three element locations of a 16 element vector. Using this information of the input control vector 656, the VPSHUFB instruction 603 performs this barrel roll action for both the low half and high half of the 32 element input vector 651. As such, a first lane of results organized as n0, o0, p0, a0 . . . m0 is observed next to a second lane of results organized as n1, o1, p1 . . . m1 in the resultant 658 of the VPSHUFB instruction 603. The resultant 658 of the VPSHUFB instruction 603 effectively corresponds to an intermediate value that is used during the final calculations of the code sequence. As discussed further below, the resultant 658 of the VPSHUFB instruction corresponds to the production of the first intermediate value 501 having upper portions 502 of FIG. 5. Here, portion 663 of resultant 658 corresponds to upper portions 502 of FIG. 5.

In order to setup the second intermediate value for the code sequence, another VPSUBB instruction 604 is executed that subtracts the rax shift value 652 from the blend mask vector 654 and places the result in register ymm5. An exemplary resultant 659 of this VPSUBB instruction 604 is observed for exemplary code sequence 650. As will be observed further below, the resultant 659 of the second VPSUBB instruction 604 is used as a final control vector for the final instruction 607 that produces the final roll result.

The elements in ymm3 are then XORed 605 against themselves to produce a vector 660 of all zeroes in ymm3. Here, as the resultant of the VBROADCAST instruction 601 is no longer needed after the first VPSUBB instruction 602, instruction 605 essentially reuses ymm3 to create a new intermediate value.

Figure 1:
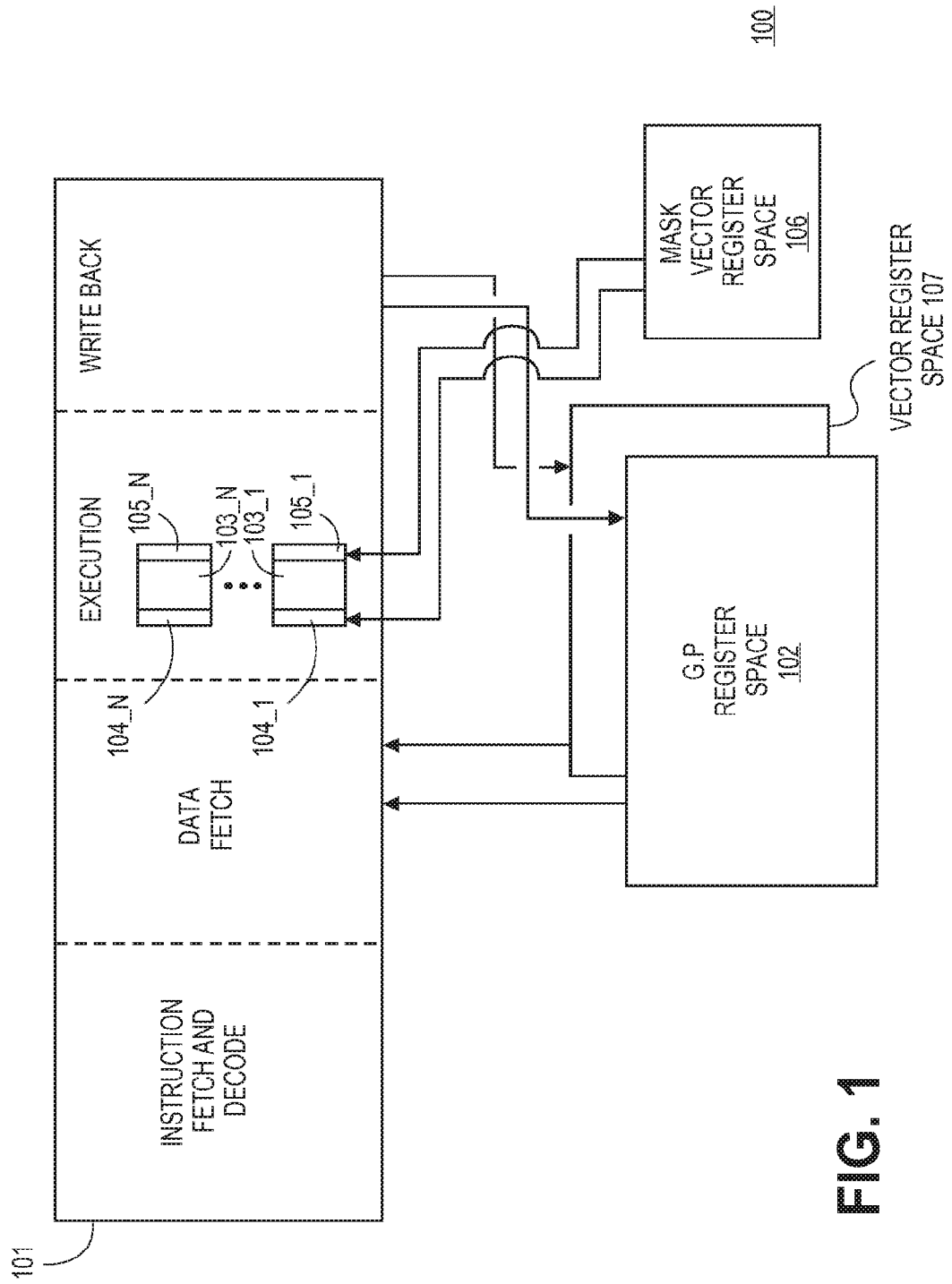
Figure 2A:
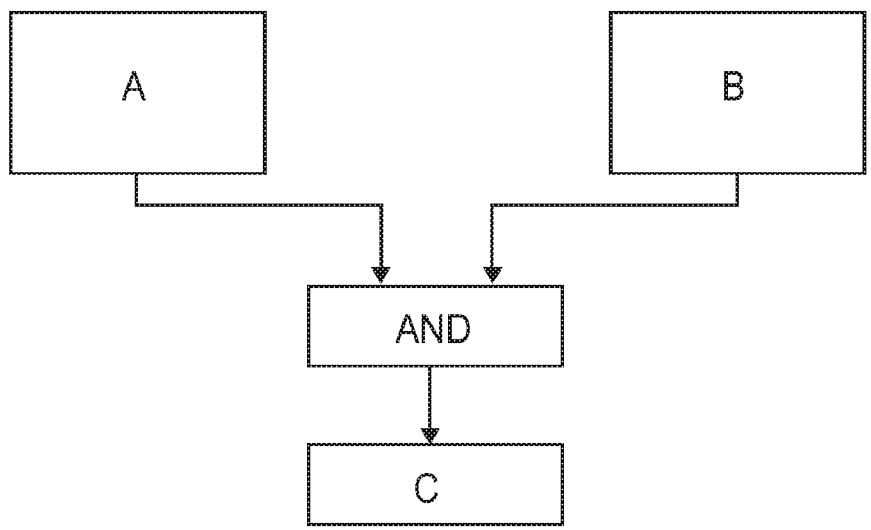
Figure 2B:
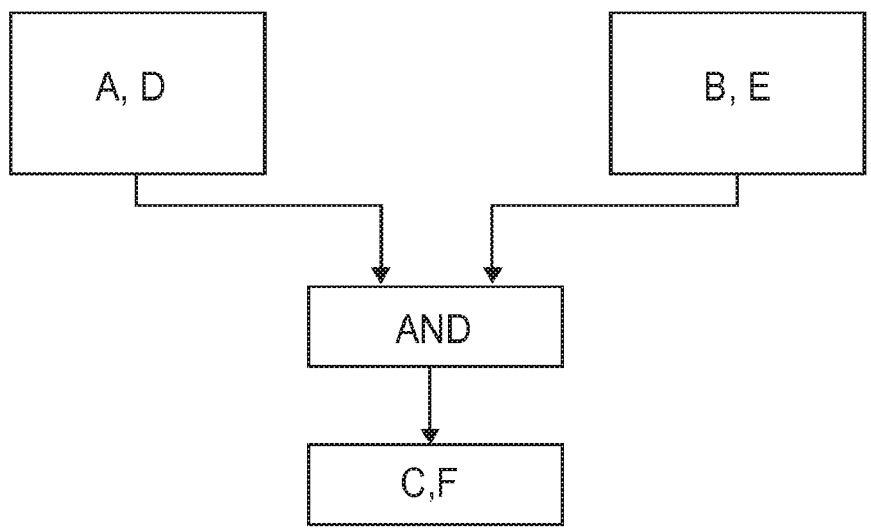
Figure 3E:
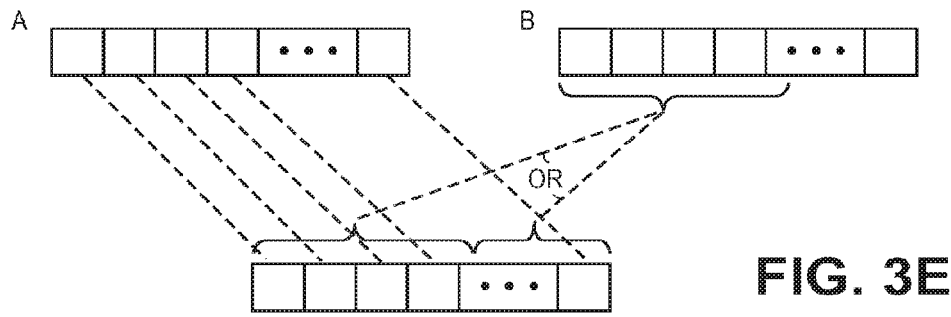
Figure 3F:
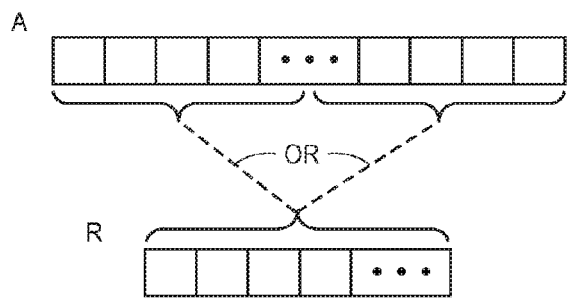
Figure 3G:
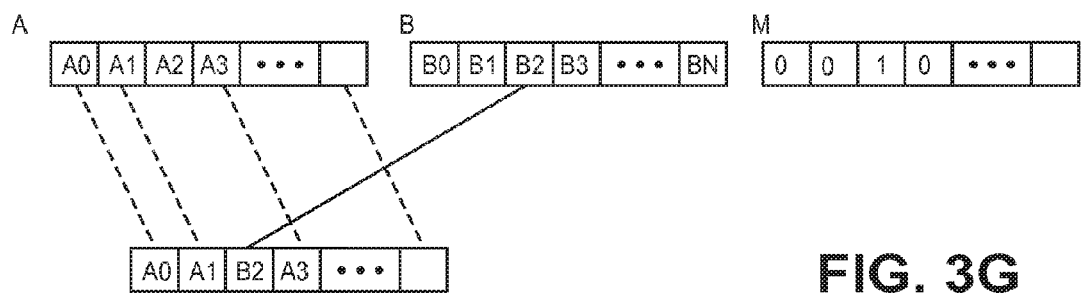

The value in ymm3 containing all zeroes 660, and, the resultant of the VPSHUFB instruction 603 in ymm4 are used as input operands for a VINSERT instruction 606. Here, the vector containing all zeroes 660 in ymm3 is viewed as the resultant of the VINSERT instruction 606 that specific identified elements of the resultant 657 of the VPSHUFB instruction in ymm4 are inserted into. Here, recalling the discussion of the VINSERT instruction of FIG. 3e of the background, the lower half of the contents in ymm4 are inserted into the higher half of ymm3 to create a resultant 661 in ymm3 whose lower half is all zeroes and whose upper half corresponds to the lower half of the VPSHUFB resultant 657. The resultant of the 661 of the VINSERT instruction 606 corresponds to the second intermediate value 503 of FIG. 5 having lower portions 504. Here, portion 664 of resultant 661 corresponds to lower portions 504 of FIG. 5.

The final instruction is a VPBLEND instruction 607 that constructs the final roll result 662 by blending region 664 of the VINSERT resultant 661 into the resultant 658 of the VPSHUFB instruction 604. Here, recalling that the resultant 659 of the second VSUBB instruction 604 is used as a control vector for the final instruction 607, note that vector 659 effectively identifies the two separate upper and lower portions 663, 664 of the final resultant. More specifically, the byte values of the second VSUBB resultant 659 that correspond to region 664 each begin with a "1" as opposed to the byte values of second VSUBB resultant 659 which each begin with a "0". The presence of the "1" in the control vector 659 provided to the hardware that executes the final VPBLEND instruction 607 differentiates those elements from the other resultants of the instruction 607 so that the hardware inserts values from region 664 of vector 661 into that same region in vector 657 in order to produce the final rolled result 663.

FIG. 6 demonstrated an embodiment where a pair of VSUBB instructions 602, 604 were used to determine respective control vectors for the VPSHUFB and VPBLEND instructions. Both of the VSUBB instructions 602, 604 also utilized a vector in ymm3 created by a VBROADCAST instruction 601 that broadcasted the rax value.

FIG. 7 shows another approach that utilizes lookup tables to generate the respective control vectors for the VPSHUFB and VPBLEND instructions. As a consequence, the VSUBB instructions 602, 604 that were utilized in the approach of FIG. 6 are not present. In effect, the VBROADCAST 601 and VSUBB instructions 602, 604 of the approach of FIG. 6 were used to define the "roll" for different parts of the final result. In the approach of FIG. 7, the number sequences needed to define the roll for both the VPSHUFB and VPBLEND instructions are instead pre-stored as look-up table information. As such, the instruction sequence 700 simply looks up the number sequences by way of VBROADCAST instructions 702, 703 and provides them to the VPSHUFB and VPBLEND instructions 704, 706.

The discussion of FIG. 7 immediately below refers to both an instruction sequence 700 and an exemplary process flow 750 of the instruction sequence that demonstrates intermediate values utilized by the instruction sequence 700. According to the instruction sequence 700 of FIG. 7, a first instruction 701 reformats the rax value into the negative of the rax value (-rax) 753. The negative of the rax value is then combined with the address (rsi) of a first lookup table 751 and the number of values to be looked up form an input operand for a first VBROADCAST instruction 702.

In the case of the exemplary process flow 750 there are 32 values to be looked up consistent with the base exemplary environment of 256 bit width vector sizes processed at byte length granularity (i.e., there are 32 bytes in 256 bits). Said another way, to support a roll of 32 vector element locations, 32 values are looked up from the rsi table 751 by way of the first VBROADCAST instruction 702. Here, position rsi+32 corresponds to position 760 in the rsi table 751. As such, in the example of rax=13, the input operand (rsi+32-rax) for the first VBROACAST instruction 702 corresponds to position 761 in the rsi table 751. As such, in the exemplary process flow 750 of FIG. 7, the first VBROADCAST instruction 702 fetches 32 values from the rsi table 751 starting from position 761. These values are depicted as vector 754 in ymm1 in the exemplary process flow 750 and correspond to the correct control vector for the VPSHUFB instruction 704.

Similarly, appropriate values for the subsequent VPBLEND instruction 706 are looked up from the rdi table 752 with a second VBROADCAST instruction 703 and placed in both lanes of ymm3. Here, in the exemplary process flow 750, sixteen values are looked up from rdi table 751 and are duplicated to form two identical lanes of the looked up values 755 which are then placed in ymm3. The processing then proceeds as described above for FIG. 6. Here, note that portion 759 of vector 756 corresponds to upper portion 502 of the first intermediate operand 501 of FIG. 5 and portion 760 of vector 758 corresponds to lower portion 504 of intermediate operand 503 of FIG. 5.

FIGS. 8 and 9 pertain to a corresponding shift right operation. FIG. 8 shows a base process (like FIG. 6 with respect to shift left) and FIG. 9 shows the corresponding speedup through the use of rsi and rdi look-up tables 901, 902 (like FIG. 7). Note that the logical opposite is taken with the shift right approach of FIGS. 8 and 9 in certain respects as compared to the shift left approach of FIGS. 6 and 7. Specifically, whereas the shift left approach of FIG. 6 uses subtraction instructions, the shift right approach of FIG. 8 uses addition instructions VPADD. Also, whereas the VSHUFB instruction of FIG. 6 produced an intermediate vector 658 having upper portion 663 of the resultant, by contrast, the VSHUFB instruction of FIG. 8 produces an intermediate vector having higher portion 801 of the resultant. Likewise, whereas the VINSERT instruction of FIG. 6 produced an intermediate vector having lower portion 664 of the resultant, by contrast, the VINSERT instruction of FIG. 8 produces an intermediate vector having lower portion 802 of the resultant.

Figure 10:
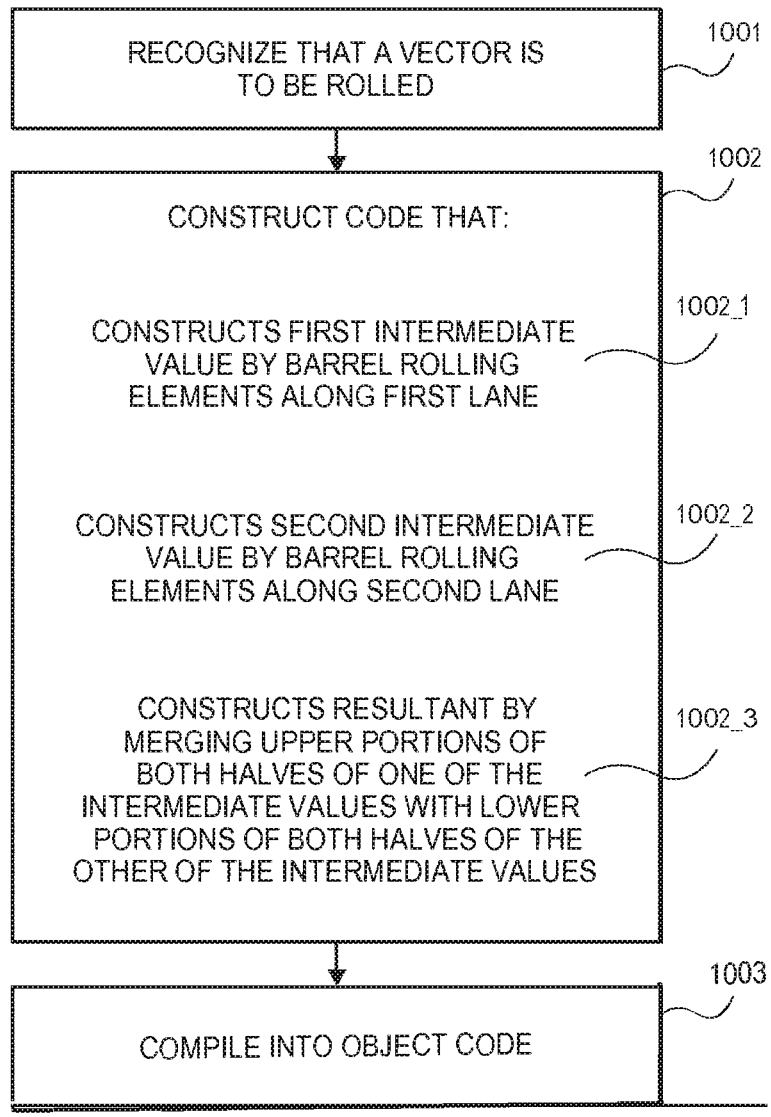
FIG. 10 shows a process that can be performed by a compiler.

FIG. 10 shows a methodology that can be performed, for instance, by a compiler that builds code for execution by a processor having an instruction execution pipeline. According to the methodology of FIG. 10, the compiler recognizes in the numerical sequences of the code being compiled that the contents of a vector are to be rolled 1001. In response, the compiler builds a code sequence 1002 that constructs a first intermediate vector by barrel rolling elements of the input vector along one of two lanes defined by the upper and lower halves of the input vector 1002_1. The code sequence also constructs a second intermediate vector by barrel rolling elements of the input vector at least along the other of the two lanes 1002_2. Upper and lower portions of the upper and lower halves of the resultant are then defined by merging an upper portion of the upper and lower halves of the first intermediate vector with a lower portion of the upper and lower halves of the second intermediate vector 1002_3. The code sequence is eventually compiled into object code 1003 for execution by a processor.

Figure 11:
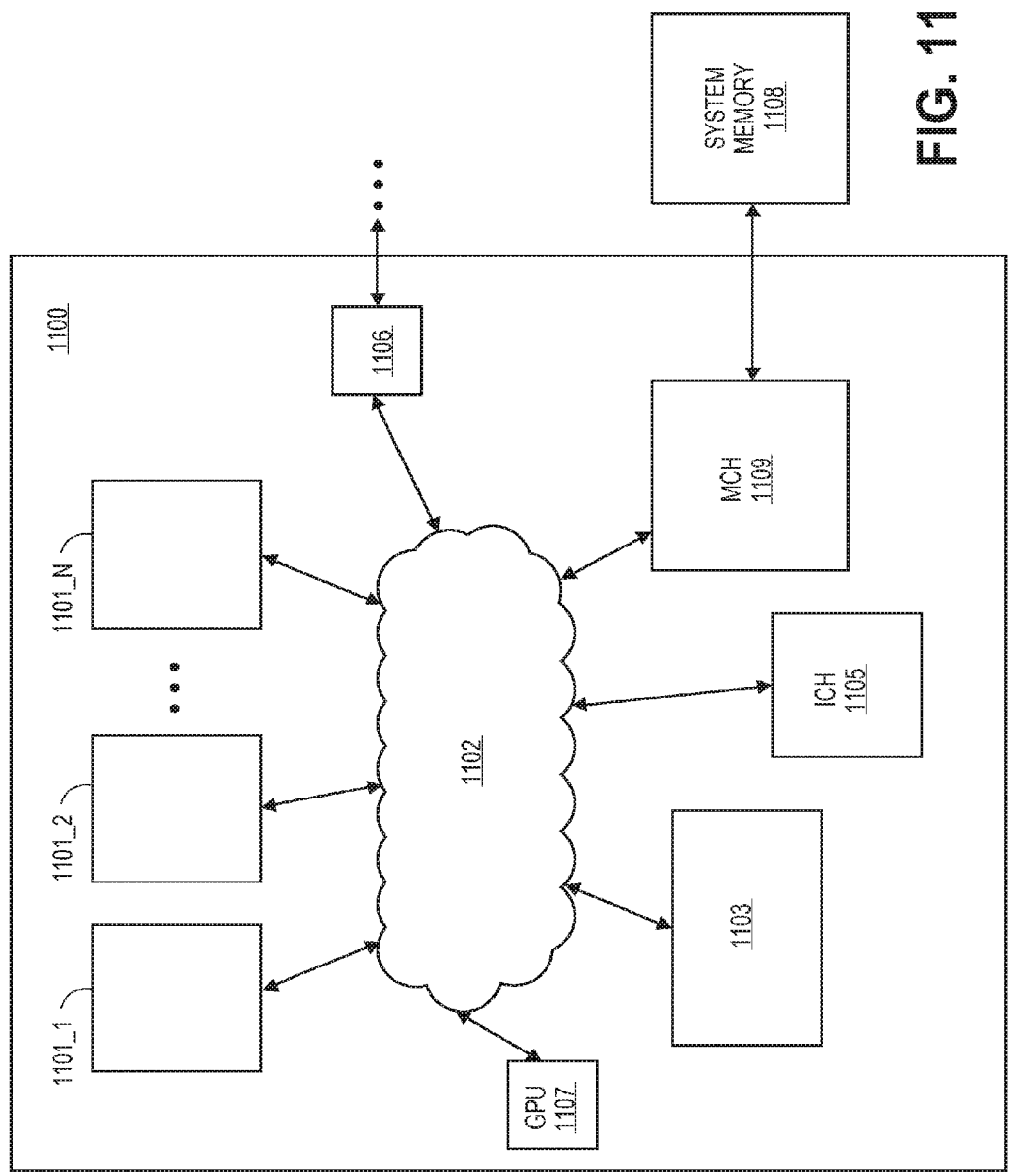
FIG. 11 shows an exemplary processor that can execute a compiler's code and/or any of the shift operations described above.

FIG. 11 shows the architecture of a standard multi-core processor design 1100 with a computing system. As observed in FIG. 11, the processor includes: 1) multiple processing cores 1101_1 to 1101_N; 2) an interconnection network 1102; 3) a last level caching system 1103; 4) a memory controller 1104 and an I/O hub 1105. Each of the processing cores contain one or more instruction execution pipelines for executing program code instructions such as a vector instructions such as any of the instructions discussed above. The interconnect network 1102 serves to interconnect each of the cores 1101_1 to 1101_N to each other as well as the other components 1103, 1104, 1105. The last level caching system 1103 serves as a last layer of cache in the processor 1100 before instructions and/or data are evicted to system memory 1108. The memory controller 1104 reads/writes data and instructions from/to system memory 1108. The I/O hub 1105 manages communication between the processor and "I/O" devices (e.g., non volatile storage devices (such as hard disk drive devices and/or non volatile memory devices) and/or network interfaces). Port 1106 stems from the interconnection network 1102 to link multiple processors so that systems having more than N cores can be realized. Graphics processor 1107 performs graphics computations. Other functional blocks of significance (phase locked loop (PLL) circuitry, power management circuitry, etc.) are not depicted in FIG. 11 for convenience. The processor of FIG. 11 can conceivably execute any of the shifting processes discussed above and/or compiling processes discussed above.

As any of the processes taught by the discussion above may be performed with software, such processes may be implemented with program code such as machine-executable instructions that cause a machine (such as a processor) that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A non-transitory machine readable storage medium containing program code that when processed by a processor causes a method to be performed, the method comprising:
   creating a resultant rolled version of an input vector by:
   forming a first intermediate vector by performing a first roll operation on elements of said input vector in a first of two lanes defined by an upper half and a lower half of said input vector and
   performing a second roll operation on elements of said input vector in a second of said two lanes;
   forming a second intermediate vector from a portion of the first intermediate vector; and
   forming said resultant rolled version of said input vector by incorporating upper portions of one of said intermediate vectors' upper and lower halves as upper portions of said resultant's upper and lower halves and incorporating lower portions of the other intermediate vectors' upper and lower halves as lower portions of said resultant's upper and lower halves.

2. The non-transitory machine readable storage medium of claim 1 wherein said resultant is formed by execution of a vector blend instruction.

3. The non-transitory machine readable storage medium of claim 1 wherein said first intermediate vector is formed by execution of a vector shuffle instruction and said second intermediate vector is formed by execution of a vector insert instruction.

4. The non-transitory machine readable storage medium of claim 3 wherein a control vector for said first intermediate vector is formed by execution of a vector broadcast instruction.

5. The non-transitory machine readable storage medium of claim 3 wherein a control vector for said first intermediate vector is formed by looking up said control vector's elements from a look-up table.

6. The non-transitory machine readable storage medium of claim 1 wherein said first intermediate vector is formed by execution of a vector shuffle instruction and said second intermediate vector is formed by execution of a vector extract instruction.

7. The non-transitory machine readable storage medium of claim 6 wherein a control vector for said first intermediate vector is formed by execution of a vector broadcast instruction.

8. The non-transitory machine readable storage medium of claim 6 wherein a control vector for said first intermediate vector is formed by looking up said control vector's elements from a look-up table.

9. A non-transitory machine readable storage medium containing program code that when processed by a processor causes a method to be performed, the method comprising:
   a) recognizing a vector is to be rolled; and
   b) in response to said recognizing creating a resultant rolled version of said vector by:
   forming a first intermediate vector by performing a first roll operation on elements of said vector in a first of two lanes defined by an upper half and a lower half of said vector and
   performing a second roll operation on elements of said vector in a second of said two lanes;
   forming a second intermediate vector from a portion of the first intermediate vector; and
   forming said resultant rolled version of said vector by incorporating upper portions of one of said intermediate vectors' upper and lower halves as upper portions of said resultant's upper and lower halves and incorporating lower portions of the other intermediate vectors' upper and lower halves as lower portions of said resultant's upper and lower halves.

10. The non-transitory machine readable storage medium of claim 9 wherein said resultant is formed by execution of a vector blend instruction.

11. The non-transitory machine readable storage medium of claim 9 wherein said first intermediate vector is formed by execution of a vector shuffle instruction and said second intermediate vector is formed by execution of a vector insert instruction.

12. The non-transitory machine readable storage medium of claim 11 wherein a control vector for said first intermediate vector is formed by execution of a vector broadcast instruction.

13. The non-transitory machine readable storage medium of claim 11 wherein a control vector for said first intermediate vector is formed by looking up said control vector's elements from a look-up table.

14. The non-transitory machine readable storage medium of claim 9 wherein said first intermediate vector is formed by execution of a vector shuffle instruction and said second intermediate vector is formed by execution of a vector extract instruction.

15. The non-transitory machine readable storage medium of claim 14 wherein a control vector for said first intermediate vector is formed by execution of a vector broadcast instruction.

16. The non-transitory machine readable storage medium of claim 14 wherein a control vector for said first intermediate vector is formed by looking up said control vector's elements from a look-up table.

17. A computing system comprising:
   a processor; and
   a non-volatile memory device coupled to the processor, the non-volatile memory device having program code that when processed by the processor causes a method to be performed, the method comprising:
   creating a resultant rolled version of an input vector by:
   forming a first intermediate vector by performing a first roll operation on elements of said input vector in a first of two lanes defined by an upper half and a lower half of said input vector and
   performing a second roll operation on elements of said input vector in along a second of said two lanes;
   forming a second intermediate vector from a portion of the first intermediate vector; and
   forming said resultant rolled version of said input vector by incorporating upper portions of one of said intermediate vectors' upper and lower halves as upper portions of said resultant's upper and lower halves and incorporating lower portions of the other intermediate vectors' upper and lower halves as lower portions of said resultant's upper and lower halves.

18. The computing system of claim 17 wherein said resultant is to be formed by execution of a vector blend instruction.

19. The computing system of claim 17 wherein said first intermediate vector value is to be formed by execution of a vector shuffle instruction and said second intermediate vector is to be formed by execution of a vector insert instruction.

20. The computing system of claim 17 wherein said first intermediate vector is to be formed by execution of a vector shuffle instruction and said second intermediate vector is to be formed by execution of a vector extract instruction.

* * * * *